May 6, 1941. L. CHUBB 2,241,028
GLASS REPLACEMENT TOOL
Filed Jan. 28, 1938 2 Sheets-Sheet 1
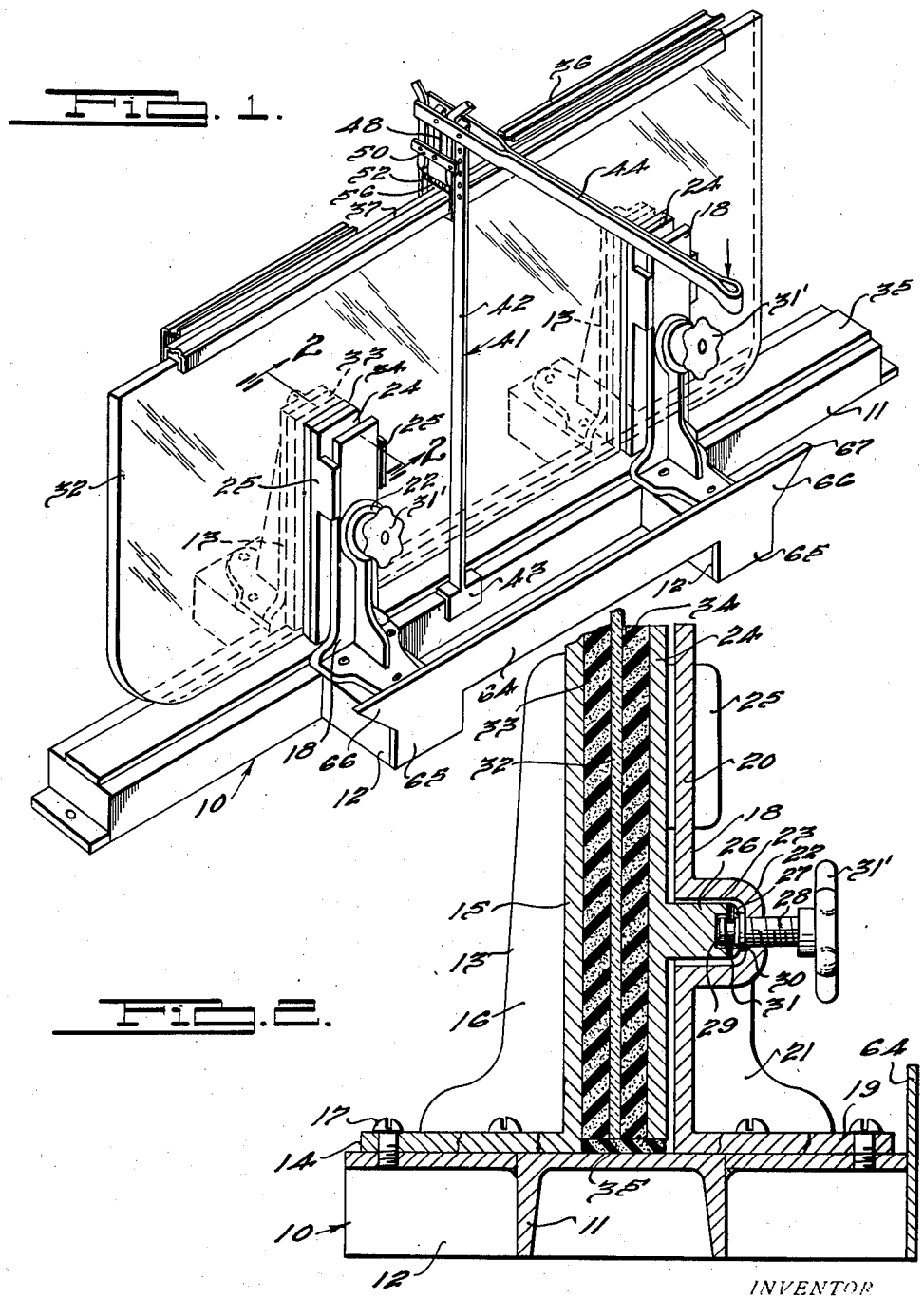

May 6, 1941. L. CHUBB 2,241,028
GLASS REPLACEMENT TOOL
Filed Jan. 28, 1938 2 Sheets-Sheet 2
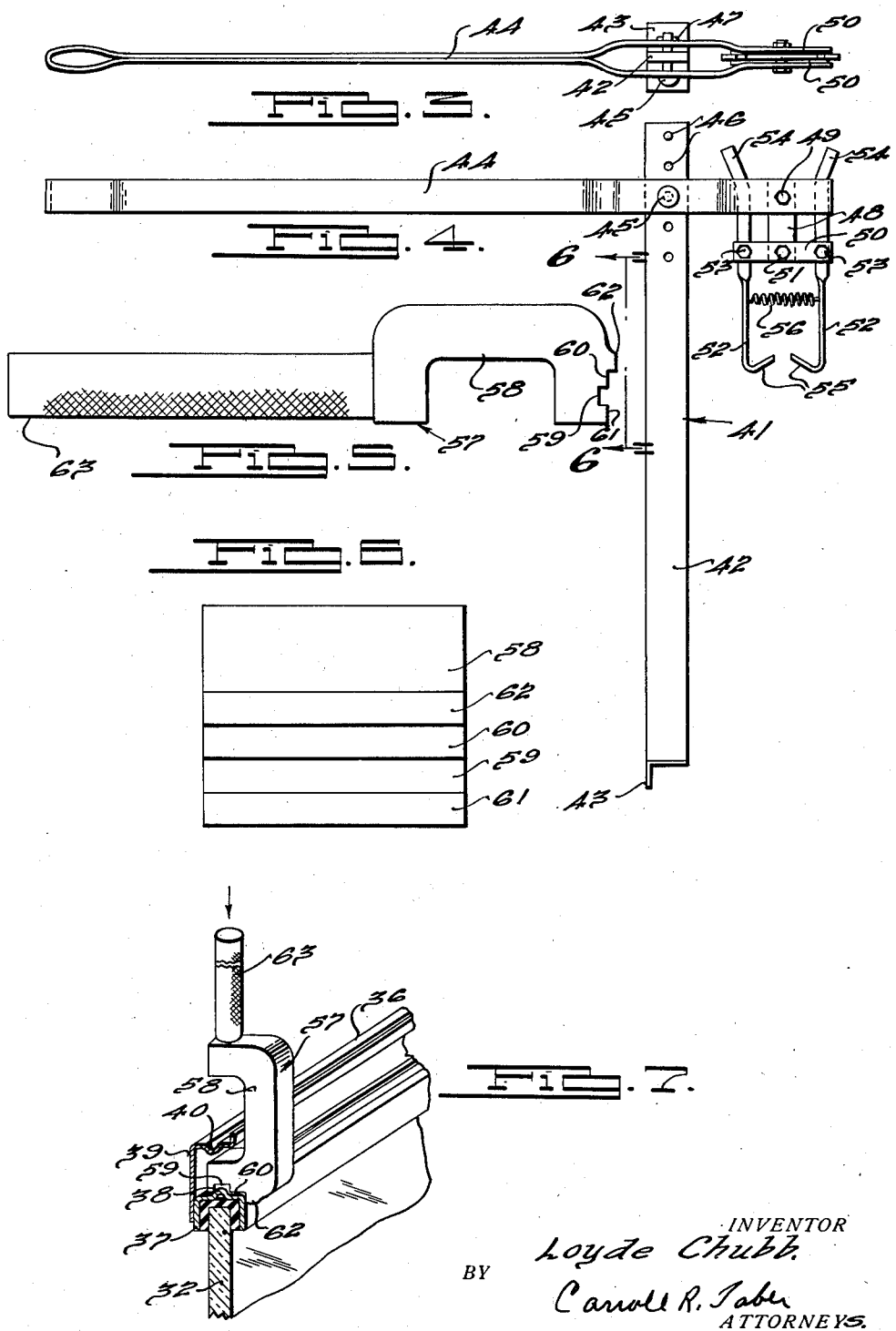
INVENTOR
Loyde Chubb.
BY Carroll R. Taber
ATTORNEYS.

Patented May 6, 1941

2,241,028

UNITED STATES PATENT OFFICE 2,241,028

GLASS REPLACEMENT TOOL

Loyde Chubb, Lansing, Mich., assignor, by mesne assignments, to Sommer & Maca Glass Machinery Corporation, a corporation of Illinois Application January 28, 1938, Serial No. 187,384

3 Claims. (Cl. 29—84)

This invention relates to devices for use in replacing the glass in automobile windows, and particularly to novel devices which are adapted for use in removing from and placing the window regulator guide channel on such window glasses.

Conventional automobile window glasses which are adapted to be opened or closed, are provided with metal channels on at least one edge. In the case of a broken glass that must be replaced, it is usually desirable to remove the channel from the damaged glass and place it in position on the new one. As these channels are usually fitted quite securely to the glass it is necessary to use considerable force to remove or replace them. With the tools usually employed for this purpose it is very difficult, if not impossible, to avoid distortion of the channel that renders it unfit for further use.

An object of this invention, therefore, is to provide suitable devices whereby the channels may be quickly and readily removed from and replaced on window glasses, without damage to the glasses or the channels.

Another object of the invention is to provide a novel clamping means for holding a window glass while the channel is being removed therefrom or placed thereon.

Another object of the invention is to provide a device for pulling the channel from the glass.

A still further object of the invention is to provide a tool which is adapted to be used in replacing the channel on a new pane of glass.

These objects and others ancillary thereto will become apparent in the following specification when considered in the light of the accompanying drawings, in which—

Figure 1 is a perspective view of the clamping means with a pane of glass in place therein and the channel puller in proper position for removing the channel;

Figure 2 is a sectional view taken on substantially the line 2—2 of Figure 1;

Figures 3 and 4 are respectively top plan and side elevational views of the channel puller;

Figures 5 and 6 are respectively side and end elevational views of the tool for replacing the channel; and Figure 7 is a fragmentary perspective view of a piece of glass and the channel with the channel replacement tool in place therein.

The device herein disclosed consists primarily of four parts: (1) the clamp 10, (2) the channel puller 41, (3) the channel replacement tool 57, and (4) the anvil 64.

The clamp is shown in Figures 1 and 2. It consists of a base 10 which, in the present instance, is made up of relatively heavy channel irons welded or otherwise secured together to form a long central body portion 11 and cross-pieces 12. On the two cross-pieces 12 are mounted two uprights 13. Each upright includes a base 14 and a vertical portion 15 having a flat face in a plane parallel to the elongated member 11. The uprights 13 are provided with ribs 16 for rigidity, and are rigidly secured to the base 10 by a plurality of machine screws 17.

Spaced from the uprights 13 is another pair of uprights 18 which are formed in a manner generally similar to the uprights 13. They consist of bases 19, vertical portions 20 and ribs 21. In addition, uprights 18 have bosses 22 which are recessed at 23 for a purpose which will presently appear.

A movable pressure plate 24 is associated with each upright 18. Each pressure plate 24 has a pair of guide flanges 25 that receive the vertical portion 20 of the upright 18 to prevent rotary movement of the pressure plate 24 as it is moved relatively to upright 18.

Each pressure plate 24 is also provided with a solid boss 26 which is smaller in diameter and shorter in length than the recess 23 in the boss 22. The boss 26 is mounted in the recess 23, but due to the difference in size of the two, a relatively large amount of play between the parts is allowed.

In the end of the boss 26 is a cylindrical recess 27 which receives the end of a screw threaded shaft 28. The end of the shaft 28 has an annular groove 29. A pin 31 is inserted in a hole extending through the boss in such a manner that it is received in the groove 29 and prevents removal of the shaft. The shaft 28 is also provided with a shoulder 30 which abuts the end of the boss 26 for transmitting pressure thereto. A hand wheel 31' is rigidly attached to the outer end of the screw threaded shaft 28 in order that the latter may be rotated. It will be readily apparent that by screwing the shaft 28 in or out, the movable pressure plate 24 may be made to approach or recede from the rigid upright 13 in order to clamp a pane of glass 32 therebetween.

The inner faces of the upright 13 and the pressure plate 24 are covered with sheets of sponge rubber 33 and 34 respectively in order to protect the glass as well as provide a positive frictional engagement between the glass 32 and the clamp. The longitudinal member 11 of the base is also covered with a strip of sponge rubber 35 on which the edge of the glass rests when it is mounted in the clamp.

The usual window regulator guide channel with which automobile windows are provided is shown at 36 in Figures 1 and 7. It consists of a channel portion 37 which has a bead 38 in the metal of the base and an angle member 39 welded or otherwise secured to the channel. This angle member 39 is also provided with a bead 40 on which the window regulator rollers (not shown) are guided.

In order to remove this channel from a broken or cracked pane of glass, the channel puller 41 shown in Figures 1, 3 and 4 is used. The preferred construction of the channel puller includes an upright support 42 at the end of which is secured an angle iron 43. At its upper end is a lever 44, fulcrumed on a pin 45. The upright 42 is provided with a plurality of spaced holes 46 which allow the lever 44 to be adjusted thereon. The lever 44 is formed from a strip of metal which is doubled back upon itself with the two parts spot welded or otherwise secured together but with the end adjacent the upright 42 spaced apart in order that it may straddle the upright. The pin 45 is inserted in holes in the lever 38 and passes through one of the holes 46 and may be held in place by a cotter pin or similar device 47.

On the end of the lever 44 is a link 48 which is pivoted on a bolt 49 on the lever. A pair of parallel cross bars 50 are pivoted on the link 48 by means of a bolt 51. Two movable hook-like jaws 52 are pivoted on the outer ends of the cross bars 50 by means of bolts 53. The upper ends of bars forming the jaws 52 are extended above the lever 44 as at 54 in order that they may be gripped and spread apart by the operator. The lower ends of the jaws 52 are bent upwardly as at 55 to form hooks which engage the edges of the walls of the channel 36. A coil spring 56 is secured to each of the jaws 45 and tends to pull the jaws toward each other at all times.

In operation the angle member 43 of the upright 42 is seated on the base 11 and the hooks 55 of the jaws 52 engage the walls of the channel 36 whereupon a downward force on the lever 44, as indicated by the arrow in Figure 1, will lift the channel 36 from the glass. The peculiar grapple mechanism above described which consists of the link 48, cross bars 50 and jaws 52, is such that the downward movement of the lever 38 will always be equally distributed on both walls of the channel. In other words, the said grapple mechanism acts as an equalizer.

The channel replacement tool 57 shown in Figures 5, 6 and 7 is used to replace the channel on a new pane of glass. If ordinary tools are used it is usually necessary to use repeated blows, or else considerable pressure to replace the channel. Consequently, when it is hammered into place on the glass there is a tendency to flatten the bead 38, thereby deforming it in such a manner that the window regulator rollers are likely to bind when the window is reassembled. The tool herein disclosed obviates this difficulty by providing a means for distributing a blow on the base of the channel but on the opposite sides of the bead 38. The channel replacement tool consists of a U-shaped body portion 58, the end wall of which is grooved at 59 and provided with shoulders 60 and 61 on opposite sides of the groove. Another shoulder 62 locates the tool on the channel 37 by providing a guide which engages the outer wall of the channel. A handle 63, preferably knurled, is secured to the other wall of the U-shaped member 58.

The channel replacement tool 57 is inserted in the guide, as shown in Figure 7, and the handle 63 may be tapped with a hammer or other tool to drive the channel 36 onto the edge of the glass. Inasmuch as the body portion of the tool is U-shaped, a blow on the handle 63 will always be applied directly over the center of the channel 37, and consequently, no twisting or warping of the channel will result.

Sometimes the glass 32 is so badly damaged that it cannot be securely held in the clamp 10 while the guide channel 36 is being removed. In order that the channel may be readily removed from the glass under such conditions, the anvil 64 shown in Figures 1 and 2 has been devised.

The anvil 64 consists of a flat metal plate of a thickness which will allow it to be readily inserted in the channel 37. This plate is shaped as shown in Figure 1. The feet 65 are rigidly secured by any suitable means, preferably by welding, to the ends of cross members 12. The overhanging ends 66 of the anvil are cut in a manner to taper into knife edges 67 at each end.

In operation one end of the channel and glass is placed against one of the ends 66 of the anvil, with the knife edge 67 inserted between the glass and the base of the channel 37. The other end of the channel is then pounded with a hammer or mallet, thus driving the channel longitudinally along the anvil. The tapered end 66 of the anvil then acts as a wedge, prying the broken glass and channel apart.

It will readily appear that the invention herein disclosed may be varied in form, and consequently, I desire to be limited only by the appended claims.

I claim:

1. A tool for removing the channel from a sheet of glass comprising a support, a lever fulcrumed on said support, and a pair of jaws connected to said lever by means of a grapple mechanism, said mechanism comprising a link pivoted at one end to said lever and at the other end to a cross bar intermediate the ends of the latter, the jaws being pivoted to the respective ends of the cross bar.

2. A tool for removing a channel from a sheet of glass comprising a support, a lever fulcrumed on said support and a pair of jaws connected to said lever by means of a grapple mechanism, said mechanism comprising a link pivoted at one end to said lever and at the other end to a cross bar intermediate the ends of said cross bar, the jaws being pivoted to the cross bar at the respective ends thereof, and a spring adapted to draw the jaws together.

3. A tool for removing the channel from a sheet of glass comprising a support, a lever fulcrumed on said support, and a pair of jaws connected to said lever by means of a grapple mechanism, said mechanism comprising a link pivoted at one end to said lever and at the other end to a cross bar intermediate the ends of the latter, the jaws being pivoted to the respective ends of the cross bar, the free end of said jaws extending beyond said lever to provide end portions adapted to be grasped to pivot said jaws to spread them apart for insertion over or removal from said channel.

LOYDE CHUBB.